(12) United States Patent
Asamoto et al.

(10) Patent No.: US 7,219,155 B2
(45) Date of Patent: May 15, 2007

(54) NETWORK SYSTEM, COMMUNICATION DEVICE, AND COMMUNICATION ROUTING METHOD

(75) Inventors: Noriaki Asamoto, Kusatsu (JP);
Masahiro Hori, Kusatsu (JP);
Yoshifumi Sakamoto, Shiga-ken (JP)

(73) Assignee: International Business Machines Corporation, Armonk, NY (US)

( * ) Notice: Subject to any disclaimer, the term of this patent is extended or adjusted under 35 U.S.C. 154(b) by 1101 days.

(21) Appl. No.: 09/918,256

(22) Filed: Jul. 30, 2001

(65) Prior Publication Data

US 2002/0019871 A1    Feb. 14, 2002

(30) Foreign Application Priority Data

Jul. 31, 2000    (JP)    ............... 2000-232106

(51) Int. Cl.
*G06F 15/16*    (2006.01)
(52) U.S. Cl. .................. 709/233; 709/234; 709/235; 709/238; 709/239; 370/329; 370/464
(58) Field of Classification Search .............. 709/219, 709/232, 238–241, 224, 233–235; 370/431, 370/437, 329, 337, 464, 468
See application file for complete search history.

(56) References Cited

U.S. PATENT DOCUMENTS

| 5,040,171 | A * | 8/1991 | Osaki ..................... 370/232 |
| 6,434,129 | B1 * | 8/2002 | Struhsaker et al. ......... 370/329 |
| 6,516,192 | B1 * | 2/2003 | Spaur et al. ................ 455/450 |
| 6,570,860 | B2 * | 5/2003 | Hamalainen et al. ....... 370/329 |
| 6,778,557 | B1 * | 8/2004 | Yuki et al. .................. 370/468 |
| 2003/0142656 | A1 * | 7/2003 | Padovani et al. .......... 370/347 |

OTHER PUBLICATIONS

Yoichi, K., "Inter-Network Connector," Patent Abstracts of Japan, Publication No. 07-143181 (Jun. 2, 1995).
Kazuhiro et al., "Communication Route Controller, Communication Rounte Control Method and Communication Route Control Unit," Patent Abstracts of Japan, Publication No. 10-257098 (Sep. 25, 1998).

* cited by examiner

*Primary Examiner*—Frantz B. Jean

(57) ABSTRACT

To provide a technique for dynamically selecting an optimum communication route based on estimated transmission speed over different communication lines, a network system comprises the processes of measuring data transfer rates of a telephone line for transmitting data between a server and a client bidirectionally and of a satellite line for transmitting data in only one direction from the server to the client; and selecting one from the telephone line and the satellite line on the basis of the measured data transfer rates.

18 Claims, 12 Drawing Sheets

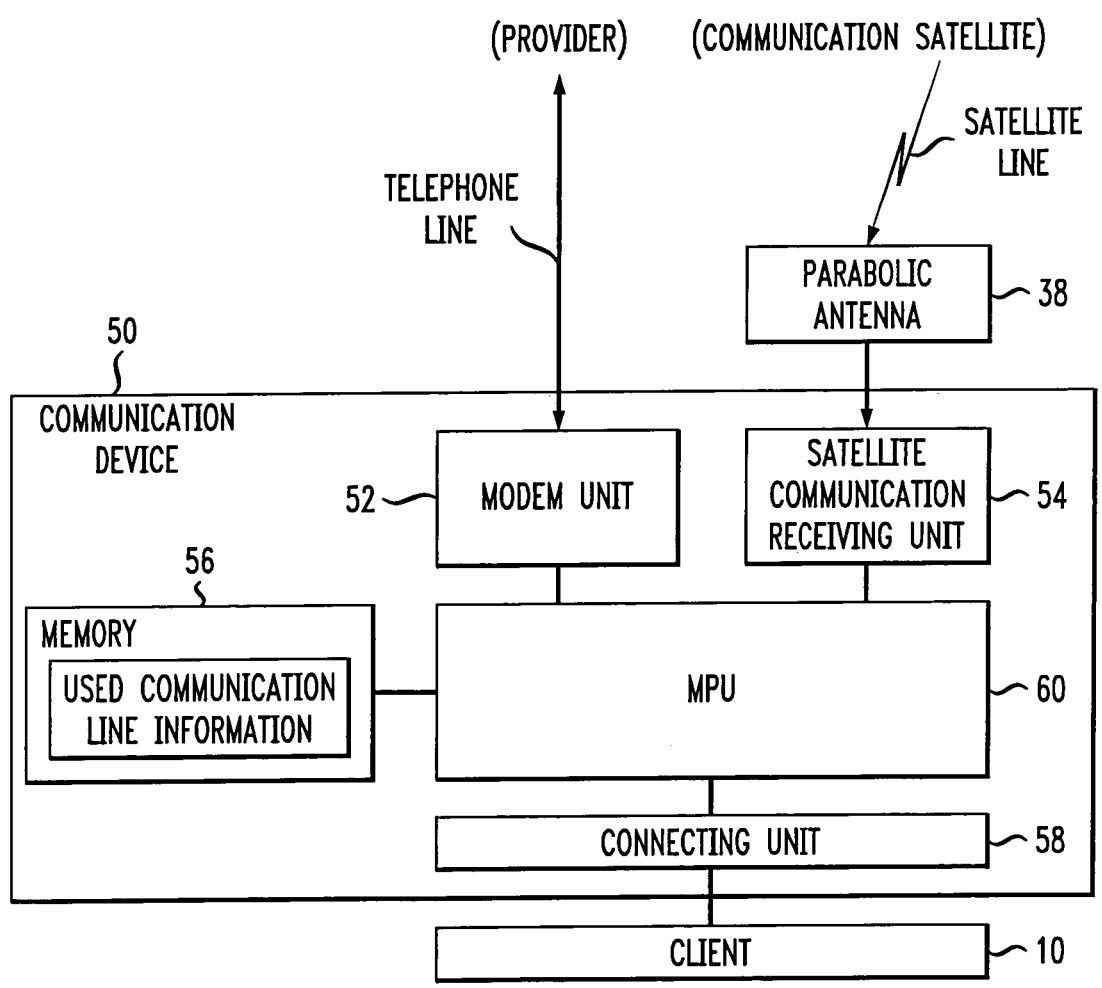

NETWORK SYSTEM, COMMUNICATION DEVICE, AND COMMUNICATION ROUTING METHOD

BACKGROUND OF THE INVENTION

1. Field of the Invention

The present invention relates to a network system, a communication device, and a communication routing method for transferring data from a sever to a client over either one of a two-way communication line for transmitting data between the server and the client bidirectionally and a one-way communication line for transmitting data in only one direction from the server to the client.

2. Description of Related Art

Internet connections via a communication satellite have recently been developed for commercial use as a medium for realizing rapid access. FIG. 10 shows an outline of an Internet connection over a communication satellite. A client 10 is connected to a telephone line and then to the Internet via a provider 22 in the same manner as in a common Internet connection. Two-way communication between the provider 22 and the client 10 is possible, and in many cases, its data transfer rate is approximately 64 kbit/s. The connection between the client 10 and the telephone line is, as shown in FIG. 11, established via a telecommunications gear, such as a modem 32 and a terminal adapter.

In Internet connections using satellite communication, it is possible to receive data over a satellite line, which is usually received over a telephone line. The satellite line is one-way wireless communication from a transmitter 26 for satellite line to the client 10 via a communication satellite 24, and its data transfer rate is usually around 1 Mbit/s. As shown in FIG. 11, a parabolic antenna 38 for receiving data transmitted from the communication satellite 24 by wireless communication and a satellite communication receiver 36 for demodulating data received by the parabolic antenna 38 are connected to the client 10.

In general Internet usage, data volume transmitted from a server 20 to the client 10 is much greater than the data volume transmitted from the client 10 to the server 20. Accordingly, the use of a satellite line is very effective.

It is, however, difficult for a satellite line to be upgraded and newly installed because of the use of the communication satellite 24. Since there is a connection between the provider 22 and the client 10 at the ratio of 1:1 via a telephone line, the data transfer rate is roughly fixed. Since a satellite line between the communication satellite 24 and the client 10 is allocated to each user at the ratio of 1:n, as the number of users is getting larger, the slower its data transfer rate becomes. In addition, the transfer rate of the satellite line easily changes depending on the weather.

Further, longer response time is required for the requested data to be received by the client 10 over the satellite line after sending a data transfer request to the server 20. As shown in FIG. 12(a), total data transfer volume of the telephone line becomes greater shortly after starting data transfer due to short response time. The transfer rate of the satellite line is generally faster than that of the telephone line, so that the final transfer time over a satellite line is faster. On the contrary, when there is a small volume of data to be transferred or the data transfer rate of the satellite line is slow due to a large number of satellite line users, as shown in FIG. 12(b), the final data transfer time of the telephone line may be faster than that of the satellite line.

It is possible to select a communication route for data transfer in Internet connections employing a conventional two-way communication line. For example, as shown in FIG. 13(a), it is assumed that the client 10 and the server 20 are connected by a communication route α via router A, router B, and router C and a communication route β via router A, router D, router E, and router F. When transferring data from the server 20 to the client 10, the server 20 specifies the forwarding address of the data, but in general, it does not particularly specify a data transfer route.

Router A selects a data transfer route in FIG. 13(a). Router A basically selects a communication route so that the number of routers that pass through to the data forwarding address may be minimum. The communication route α via router B and router C is selected in FIG. 13(a). In addition, since it is possible to conduct communication among routers on information such as data transfer rate and the like, router A can select a communication route according to the data transfer rate and the like. For example, if the data transfer rate between router C and the client 10 substantially slows down, the communication route β via router D, router E, and router F may be selected.

However, as shown in FIG. 13(b), since a satellite communication line is a one-way communication line from the communication satellite 24 to the client 10, it is impossible to carry out communication on data transfer rate and the like. In the case of a satellite communication line, the client 10 usually specifies routers used in data transmission and then the server 20 transfers data via these specified routers. In FIG. 13(b), either one of router C (communication route α) and router F (communication route β) is specified. The client 10, however, usually specifies router B (communication route α) to request for data transfer because a satellite line is generally faster than a telephone line. When a satellite line is used, it is impossible for router A to select a communication route.

It is an object of the present invention to provide a technique for dynamically selecting an optimum communication route based on estimated transmission speed over different communication lines.

SUMMARY OF THE INVENTION

The network system according to the present invention comprises means for measuring data transfer rates of a two-way communication line for transmitting data between a server and a client bidirectionally and of a one-way communication line for transmitting data in only one direction from the server to the client; and means for selecting one from the two-way communication line and the one-way communication line on the basis of the measured data transfer rates. A communication line which is faster in data transfer can be selected and used based on the data transfer rate for each communication line.

The communication device according to the present invention comprises means for measuring data transfer rates of the two-way communication line for transmitting data between a server and a client bidirectionally and of the one-way communication line for transmitting data in only one direction from the server to the client; and means for selecting one from the two-way communication line and the one-way communication line on the basis of the measured data transfer rates. A communication line which is faster in data transfer can be selected to be used based on the data transfer rate for each communication line.

The communication routing method according to the present invention comprises the steps of measuring data transfer rates of the two-way communication line for transmitting data between a server and a client bidrectionally and of the one-way communication line for transmitting data in only one direction from the server to the client; and selecting one from the two-way communication line and the one-way communication on the basis of the measured data transfer rates. Either one of the two-way communication line and the one-way communication line, which is faster in data transfer, can be selected to be used.

The present invention is capable of achieving a high speed data transmission by switching between a telephone line and a satellite line based on estimated transmission speed over the respective lines.

BRIEF DESCRIPTION OF THE DRAWINGS

FIG. 2(a) shows data transfer over a telephone line. FIG. 2(b) shows data transfer over a satellite line.

FIG. 7(a) shows a utility factor in the case of using a satellite line only. FIG. 7(b) shows a utility factor in the case of the combined use of a satellite line and a telephone line.

FIG. 9 is a block diagram showing still another example of connections among a telephone line, a satellite line, and a client.

FIG. 12(a) shows a case in which the satellite line is faster. FIG. 12(b) shows a case in which the telephone line is faster.

FIG. 13(a) shows a case of using a telephone line in connection between router C and the client. FIG. 13(b) shows a case using a satellite line in connection between router C and the client.

Figure 1:
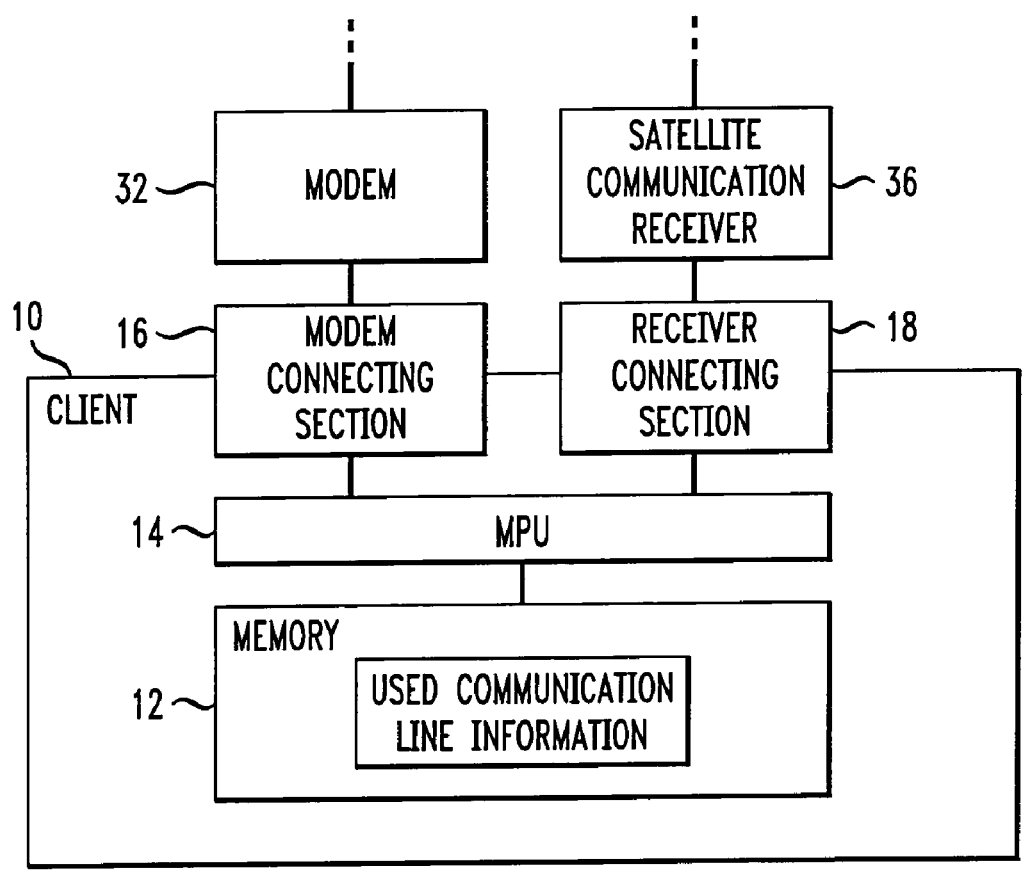
FIG. 1 is a block diagram showing a structure example of a client for performing communication routing.

REFERENCE CHARACTERS OF THE DRAWINGS 10, 40: Client
12, 56: Memory
14, 60: MPU (Microprocessor unit)
16: Modem connecting section
18: Receiver connecting section
20: Server
22: Provider
24: Communication satellite
26: Transmitter for satellite line
28: Internet
32: Modem
36: Satellite communication receiver
38: Parabolic antenna
42: Modem board
44: Satellite communication receiving board
46: Satellite broadcasting receiver
50: Communication device
52: Modem unit
54: Satellite communication receiving unit
58: Connecting unit

DESCRIPTION OF THE PREFERRED EMBODIMENTS

Figure 10:
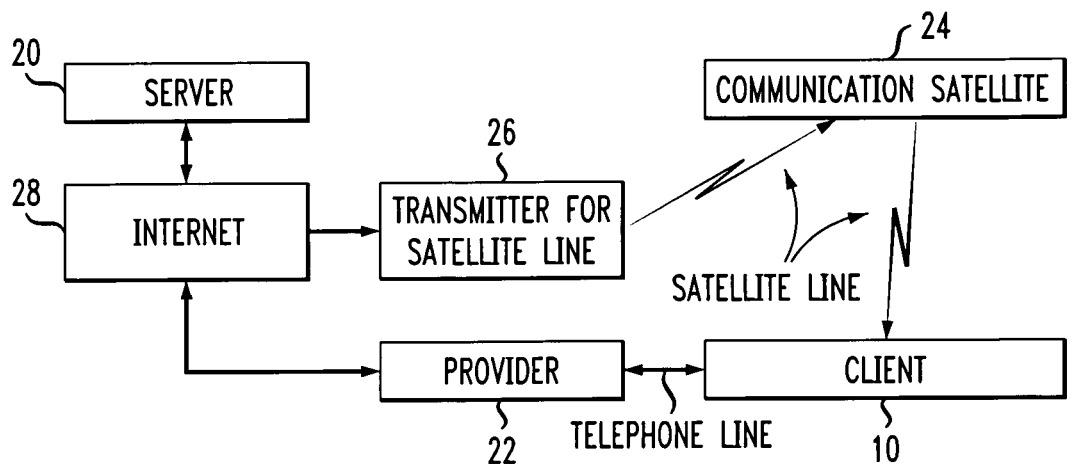
FIG. 10 is a block diagram showing an example of a connection between a client and a server.
Figure 11:
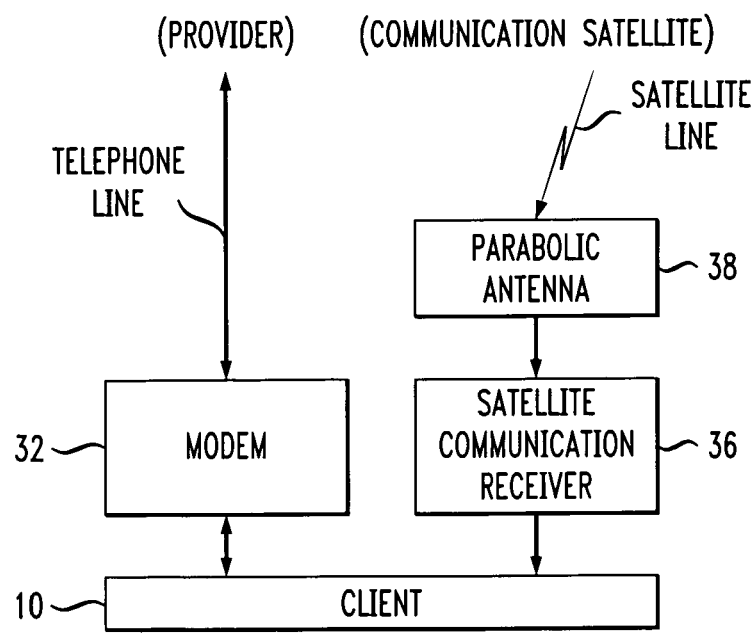
FIG. 11 is a block diagram showing a further example of connections among a telephone line, a satellite line, and a client.
Figure 12A:
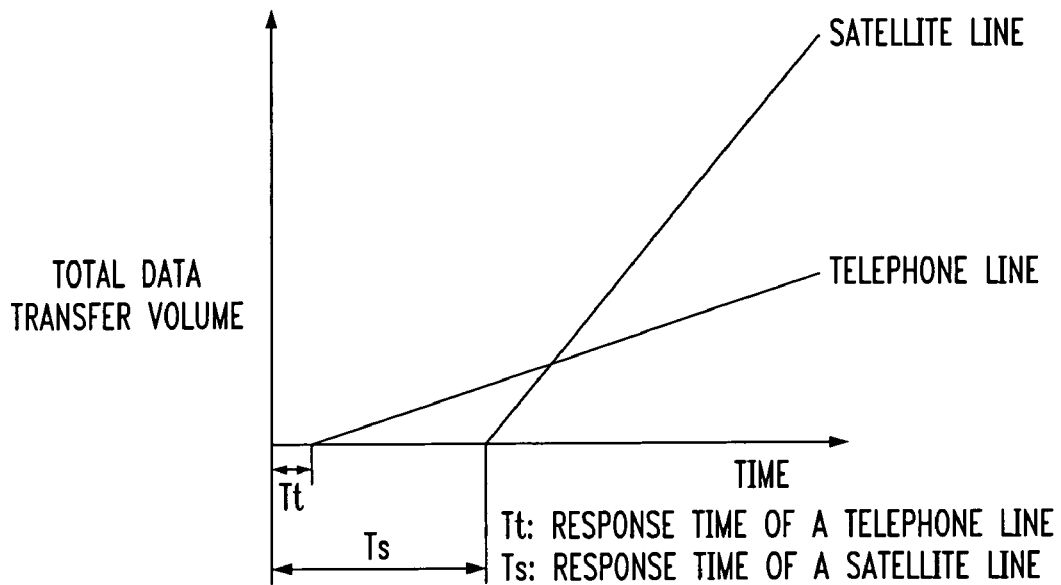
FIGS. 12(a) and 12(b) respectively show a lapse of time of total data transfer volume between a satellite line and a telephone line.
Figure 12B:
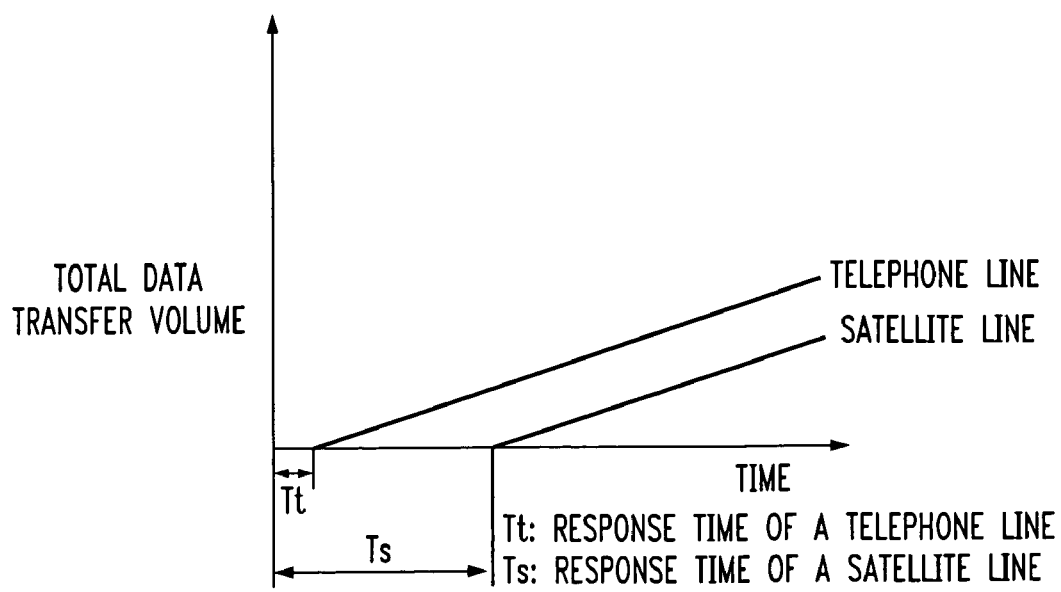
Figure 13A:
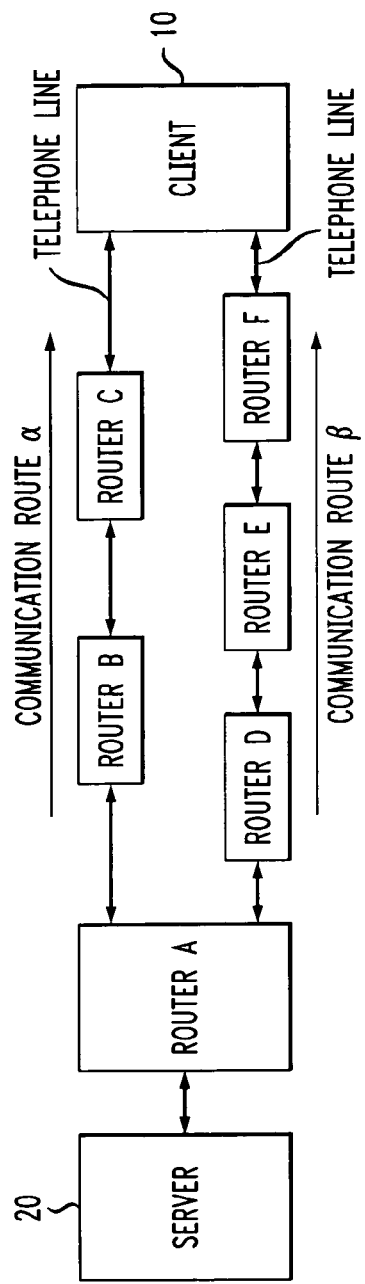
FIGS. 13(a) to 13(b) are block diagrams simplifying the connection view between a client and a server shown in FIG. 10.
Figure 13B:
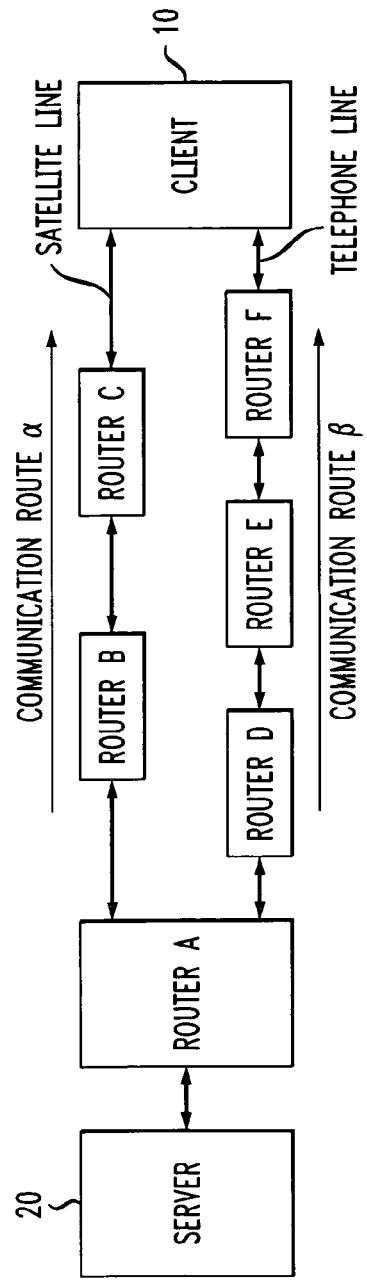

Next, a preferred embodiment of a network system, a communication device, and a communication routing method according to the present invention will be described in detail with reference to the accompanying drawings. A connection between a server 20 and a client 10 is established in the same manner as in a conventional connection (FIG. 10). Connections among a telephone line, a satellite line, and the client 10 are established in the same manner as in conventional connections (FIG. 11).

As shown in FIG. 1, the client 10 comprises a modem connecting section 16 to which a modem 32 is connected, a receiver connecting section 18 to which a satellite communication receiver 36 is connected. The modem connecting section 16 and the receiver connecting section 18 are connected to a MPU (Microprocessor unit) 14. MPU 14 requests the server 20 via the modem 32 for data transfer over a telephone line. MPU 14 specifies either one of the telephone line and the satellite line at the time of requesting for data transfer and receives data from the server 20 over the specified communication line. When data transfer is requested, the specified communication line is indicated by used communication line information stored in a memory 12.

MPU 14 can receive data transferred from the server 20 over a telephone line and data transferred over a satellite line. The received data is stored in the memory 12.

MPU 14 determines the speed of data transfer of a telephone line and of a satellite line to select one from the telephone line and the satellite line on the basis of the determined speed of data transfer. Information of the selected communication line (hereinafter referred to as used communication line information) is stored in the memory 12.

A data transfer rate is judged by estimating total time taken to transfer required data. MPU 14 determines the total time taken to transfer the required data over the communication line, which is presently used for data transfer and also requests the server 20 to transfer the required data over the other communication line, which is not presently used for data transfer, to determine the total transfer time of the required data over the other communication line.

The total transfer time is determined by adding transfer latency which is a time lag between the sending of a request to the server 20 for data transfer and the time the required data begins to be received by the client 10. The transfer time taken to transfer the whole of the required data is determined by the transfer rate and the volume or size of the required data. The transfer rate is determined by the data transfer volume received within a given measurement time after the beginning of reception of the required data.

MPU 14 compares a telephone line with a satellite line in data transfer rate to select a faster communication line. Thus, the communication line whose total transfer time is shorter is selected. If the data transfer rate of the communication line which is not in use is faster, the communication line for data transfer is switched to the communication line which is not in use. More particularly, the specification of the communication line is switched by updating the used communication line information stored in the memory 12.

MPU 14 determines the data transfer rate of each communication line periodically at a predetermined time interval.

Next, a description will be given to the operation of selection of a communication line using such a network system, a communication device, and a communication routing method.

Figure 2A:
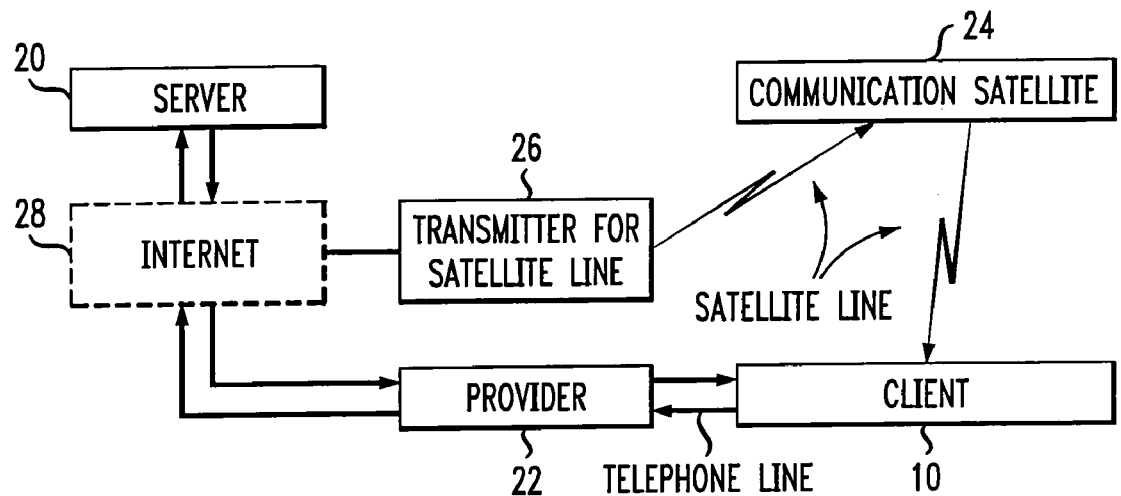
FIGS. 2(a) and 2(b) respectively show communication routing by a client shown in FIG. 1.
Figure 3A:
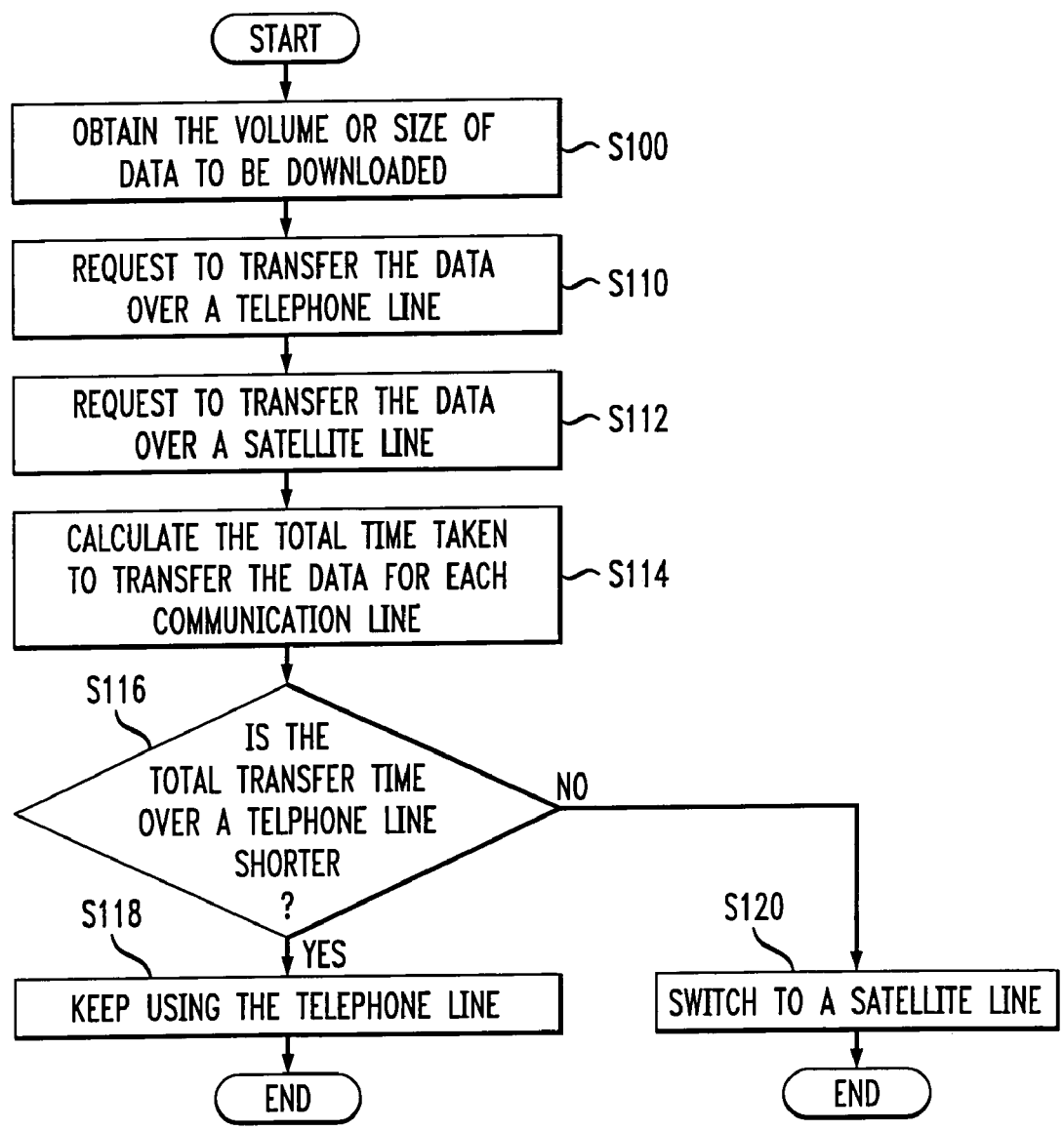
FIG. 3(a) is a flow chart showing an example of a procedure for selecting a communication line.
Figure 3B:
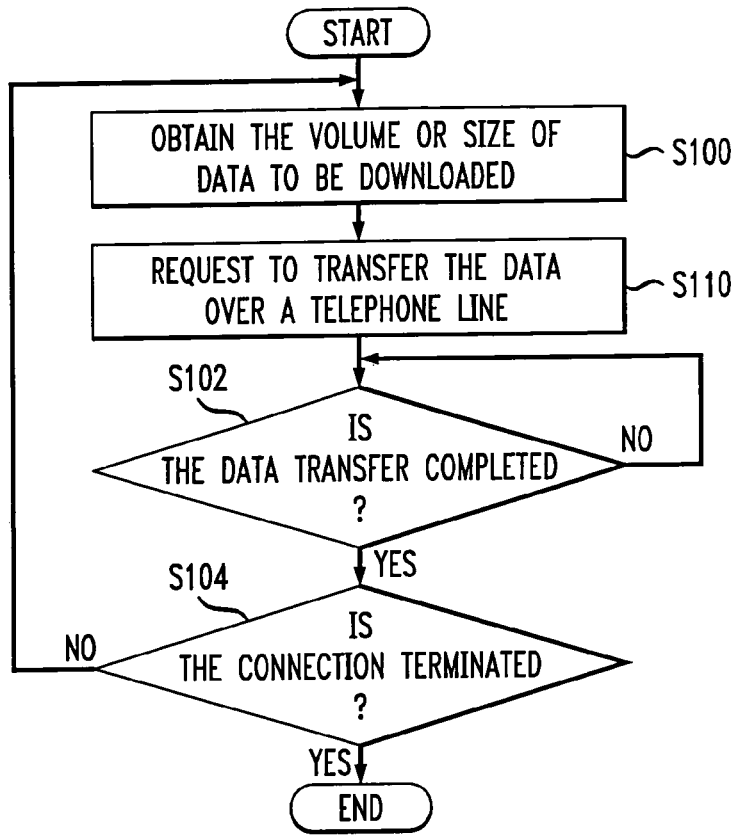
FIG. 3(b) is a flow chart of an example of a usual data transfer procedure.

It is assumed that the initial-value of the used communication line information is set to a "telephone line." When the used communication line information is a "telephone line", as shown in FIG. 2(a), a request for data transfer over a telephone line is sent from the client 10 to the server 20 to transfer data over the telephone line. FIG. 3(b) shows an example of a data transfer procedure. The client 10 obtains the volume or size of data to be downloaded (S100), and requests the server 20 to transfer the data, whose volume has been confirmed, using a telephone line (S110), and then the server 20 transfers the data (S102). Thereafter, data transfer, if any, is repeated in the same way until the connection is terminated (S104).

A data transfer rate is determined for each communication line periodically at a predetermined time interval in the present invention. Based on the determined data transfer rate, the communication line whose data transfer is faster is selected. FIG. 3(a) shows an example of a selection procedure of a communication line on the basis of the data transfer rate. The client 10 obtains the volume or size of data to be downloaded (S100), and requests the server 20 to transfer the data, whose volume has been confirmed, over a telephone line (S110), and then requests the server 20 to transfer identical data over a satellite line (S112).

Figure 6A:
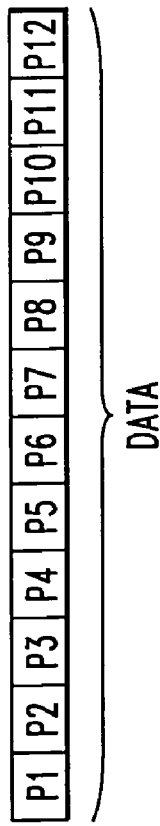
FIG. 6(a) shows an example where data is divided into packets.

It is possible to give an instruction for partial data transfer in data transfer over a satellite line (S112). For example, as shown in FIG. 6(a), it is possible to request to transfer a head packet (P1) only because Internet data is transferred in packets (P1, P2, . . . , P12) based on a communication protocol between the server 20 and the client 10.

Figure 4:
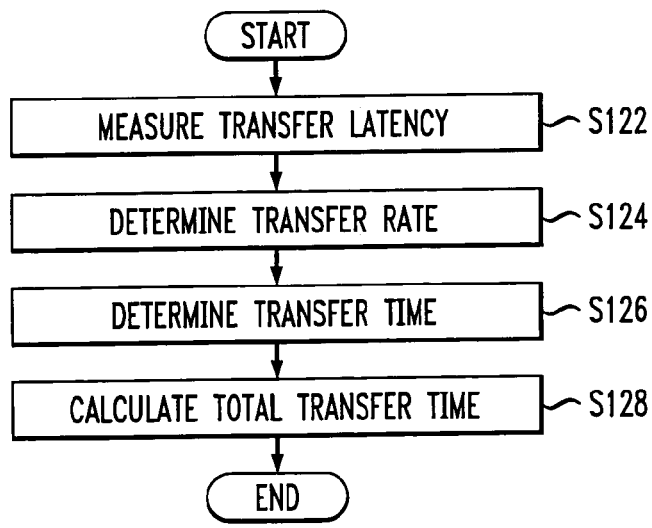
FIG. 4 is a flow chart showing an example of the calculation procedure of the total transfer time shown in FIG. 3(a).

MPU 14 calculates the total time taken to transfer the requested data for each communication line (S114). The total transfer time can be determined, for example, by the procedure shown in FIG. 4. Measure transfer latency which is a time lag between the sending of a request to the server 20 for data transfer and the time the required data begins to be received by the client 10 (S122). Determine data transfer rate from the data transfer volume received within a predetermined measurement time after the beginning of reception of the data (S124). That is, the following equation is calculated by MPU 14:

Transfer rate=Data transfer volume/Measurement time

Determine data transfer time from the data transfer rate and the data volume (S126). Accordingly, the following equation is calculated by MPU 14:

Transfer time=Data volume/Transfer rate

Total transfer time is determined by transfer latency and transfer time (S128). That is, the following equation is calculated by MPU 14:

Total transfer time=Transfer latency+Transfer time

On calculating transfer time for each communication line (S114), compare a telephone line with a satellite line in total transfer time (S116). When the total transfer time of the telephone line is shorter, keep using the telephone line (S118). When the total transfer time of a satellite line is shorter, update the used communication line information stored in the memory 12 to switch the line used for data transfer from the telephone line, to the satellite line (S120).

Figure 5:
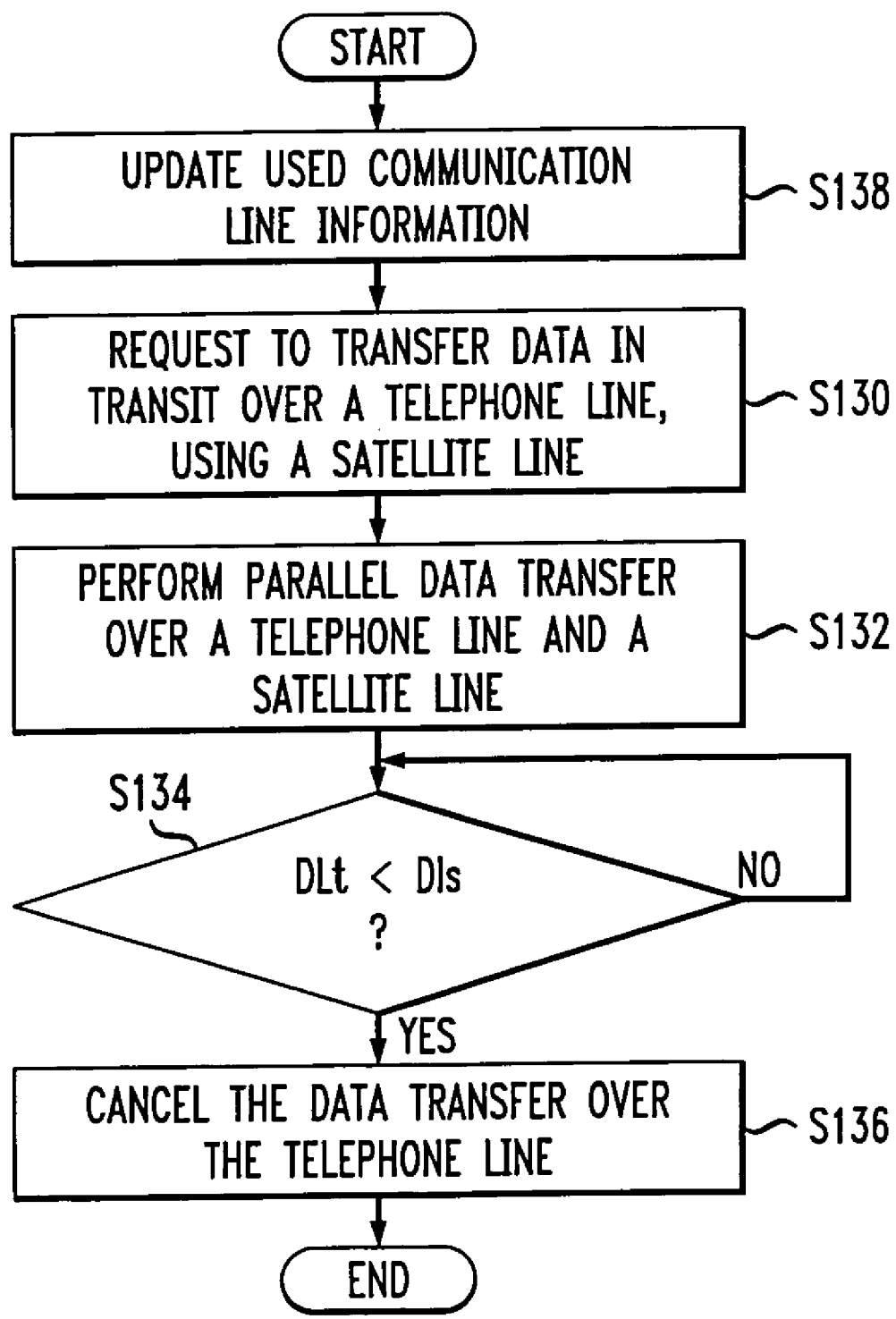
FIG. 5 is a flow chart showing an example of the procedure for switching to a satellite line shown in FIG. 3(a).

FIG. 5 shows an example of a switching procedure of the communication line. Request the server 20 to transfer data in transit over a telephone line, using a satellite line (S130) after updating the used communication line information to "a satellite line" (S138). Perform parallel data transfer over a telephone line and a satellite line (S132). Since the transfer rate of the satellite line is faster, cancel the data transfer over the telephone line (S136) when the total data transfer volume of the satellite line DLs exceeds the total data transfer volume DLt of the telephone line (S134). To cancel data transfer, a transfer cancellation request is sent from MPU 14 to the server 20.

Figure 6B:
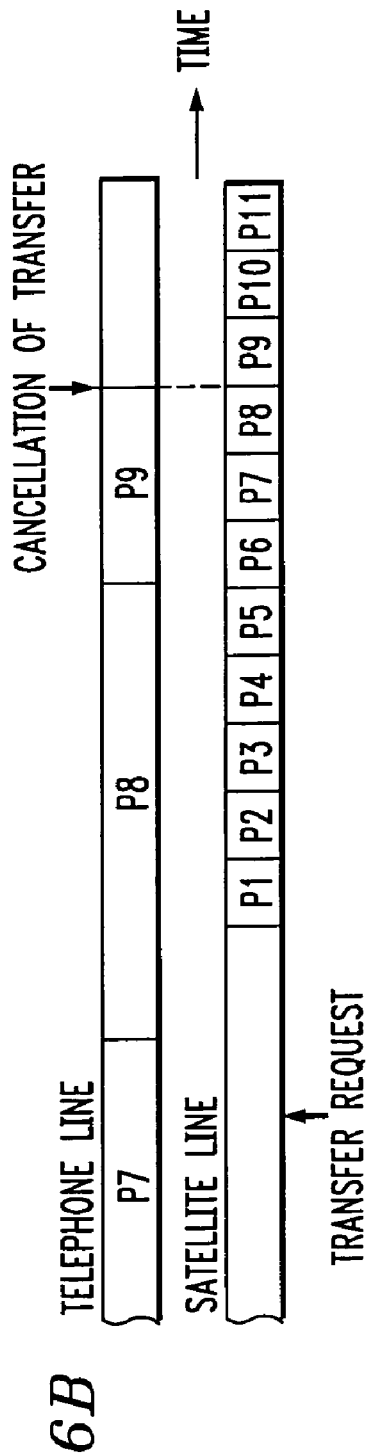
FIGS. 6(b) and 6(c) respectively show an example of transferred data at the time of switching a communication line.
Figure 6C:
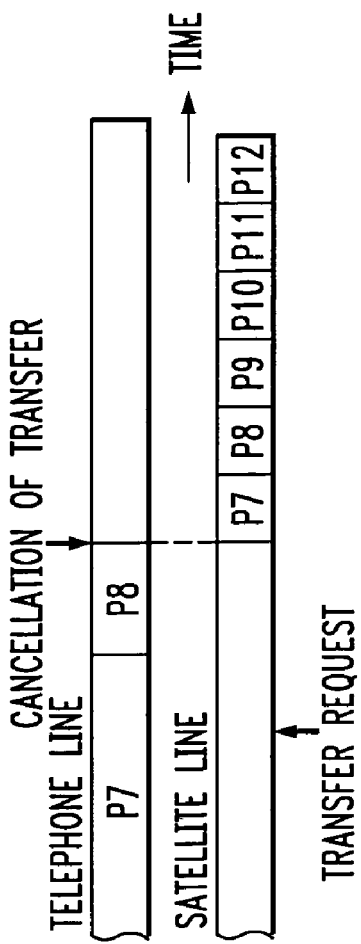

As shown in FIG. 6(b), although a cancellation of data transfer over the telephone line can be made at the point that the data transfer over the satellite line catches up with data transfer over the telephone line, as shown in FIG. 6(c), the data transfer can also be canceled at the point of starting the data transfer over the satellite line. In FIG. 6 (c), data is transferred over a satellite line from a packet P7, which is a packet in the process of being transferred over the telephone line at the time that transfer is requested.

Figure 2B:
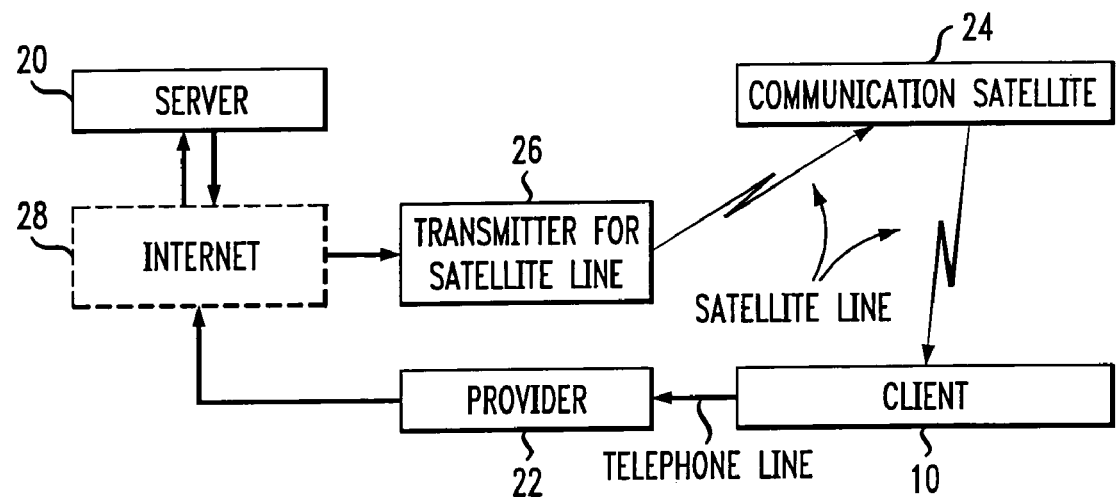

After the data transfer over the telephone line is canceled, as shown in FIG. 2(b), the data transfer is switched to the data transfer over a satellite line.

As described above, switching from a telephone line to a satellite line has been described so far, the switching from the satellite line to the telephone line can be done, as well. If the data transfer rate of a satellite line is slower than that of a telephone line, data transfer over the satellite line (FIG. 2(b)) is switched to data transfer over the telephone line (FIG. 2(a)).

Because of a little variation of communication speed in a telephone line, it is also possible to store the data transfer rate over a telephone line determined at the time of switching from the telephone line to the satellite line in the memory 12, and after that, this stored data transfer rate may be used as the data transfer rate of the telephone line. When using a measured value stored in the memory 12, further measurement of the data transfer rate of the telephone line may be omitted.

Figure 7A:
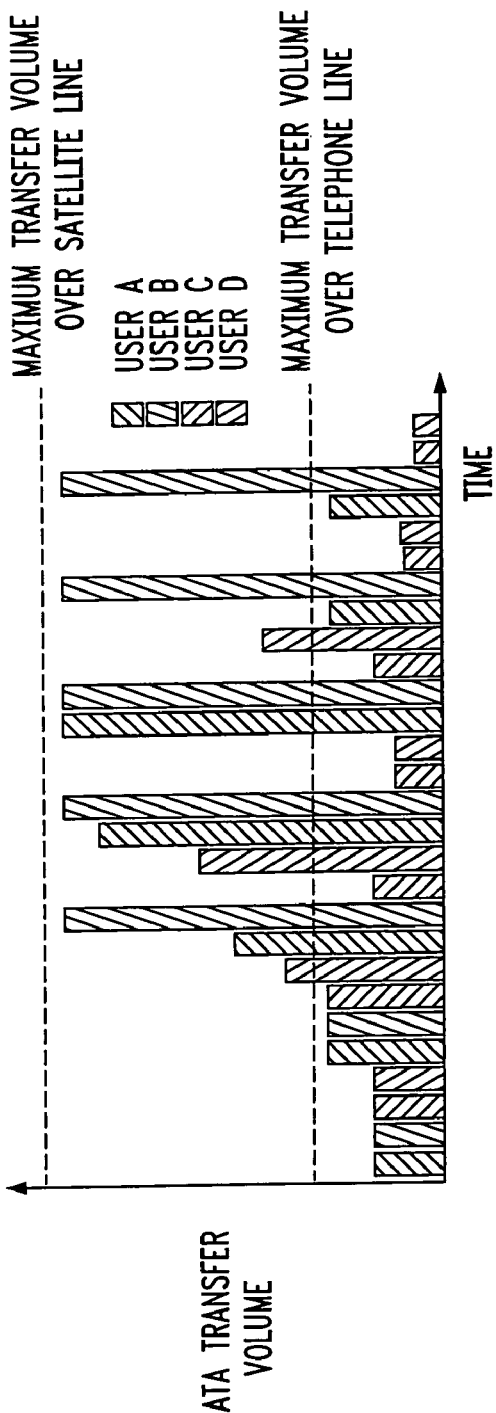
FIGS. 7(a) and 7(b) respectively show a utility factor of a satellite line.
Figure 7B:
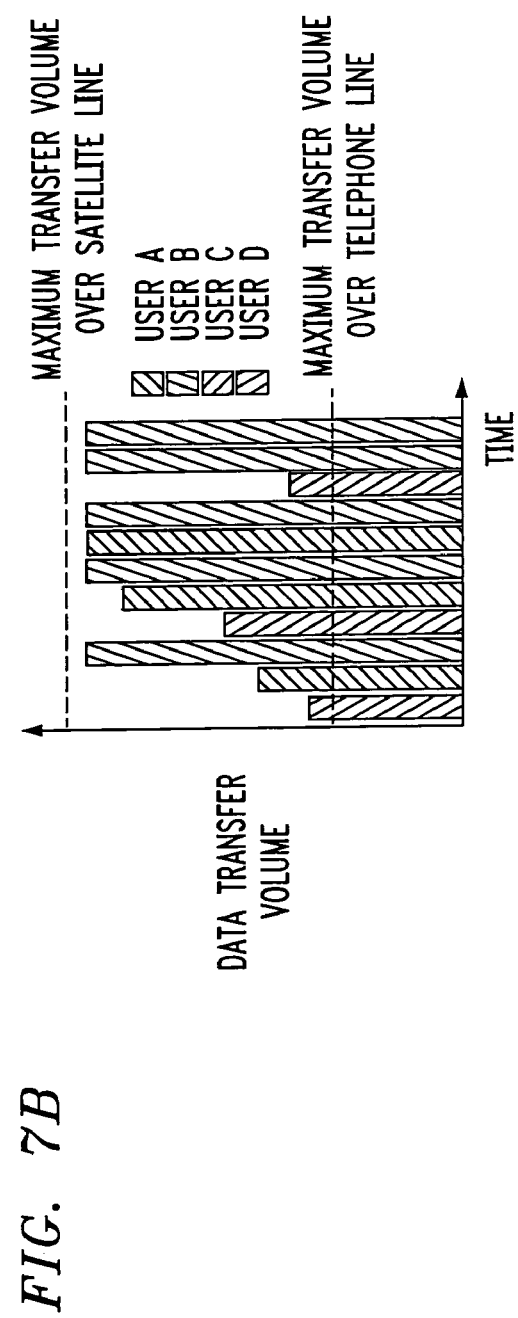

As shown in FIG. 7(a), the utilization factor of the satellite line is low when only the satellite line is used for data transmission regardless of its data transfer rate and data volume. On the other hand, when the communication line in data transfer is switched between the satellite line and telephone line according to the present invention such that data of transfer volume equal to or less than a maximum data transfer volume over the telephone line is transmitted over the telephone line and data of transfer volume more than the maximum data transfer volume over the telephone line is transmitted over the satellite line, as shown in FIG. 7(b), the utilization factor of the satellite line is improved. In FIGS. 7(a) and 7(b), data is transmitted to four users, User A, B, C and D by time division multiplexing.

Figure 8A:
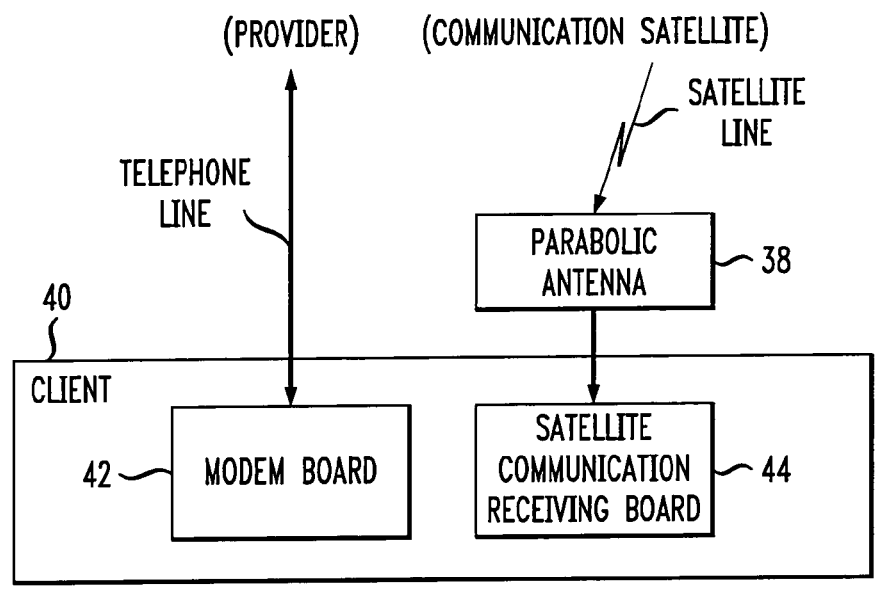
FIGS. 8(a) and 8(b) are each block diagrams showing another example of connections among a telephone line, a satellite line, and a client.
Figure 8B:
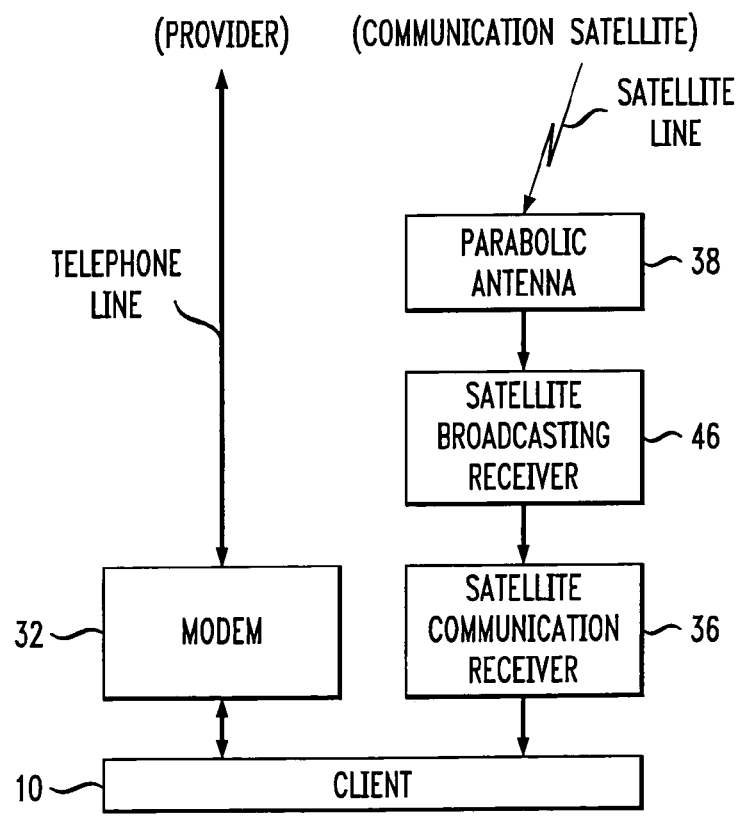

As mentioned above, one embodiment according to the present invention has been described so far, but the present invention is not limited to this embodiment. For example, as shown in FIG. 8(a), a modem board 42 and a satellite communication board 44 may be built into a client 40. As shown in FIG. 8(b), the satellite communication receiver 36 may be connected to a parabolic antenna 38 via a satellite broadcasting receiver 46.

Communication routing may be performed by a communication device connected to the client 10. For example, as shown in FIG. 9, a communication device 50 comprises a modem unit 52 to which a telephone line is connected, a satellite communication receiving unit 54 to which a parabolic antenna 38 is connected, MPU 60 to which the modem unit 52, the satellite communication receiving unit 54 and a connecting unit 58 are connected, and a memory 56 connected to MPU 60. Communication routing is performed in the same manner as in the above-mentioned embodiment using MPU 60 within the communication device 50.

A maximum data transfer rate depends on the performance of its modem and terminal adapter, so that the maximum data transfer rate of this modem or terminal adapter may be used as a data transfer rate of the telephone line. Switching from a satellite line to a telephone line may be done in the case that monitored data transfer rate of the satellite line drops to the maximum data transfer rate of the telephone line or lower.

The communication line may be switched by only updating the used communication line information (S138) instead of following all procedure shown in FIG. 5. The communication line may be switched not only based on its data transfer rate, but also based on, for example, its utility rate. When the line usage charge of a two-way communication line and a one-way communication line is proportional to hours of service, the line usage charge in the case of using each communication line is determined, whereby a communication line to be used for data transfer is selected.

The two-way communication line is not limited to a telephone line, so that a line which is capable of carrying out arbitrary two-way communication can be used. The one-way communication line is not limited to a satellite line, accordingly, a line which is capable of carrying out arbitrary one-way communication can be used.

As described above, specific embodiments of the present invention have been described so far, but the present invention is not limited to these embodiments. Also, any modification, variations or equivalent arrangements which may occur to those skilled in the art should be considered to be within the scope of the invention.

There have thus been shown and described a network system, a communication device, and a communication routing method which fulfill all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A network system for transferring data from a server to a client over either one of a two-way communication line and a one-way communication line, the two-way communication line transmitting data between the server and the client bidirectionally and the one-way communication line transmitting data in only one direction from the server to the client, comprising:
    means for measuring data transfer rates of the two-way communication line and of the one-way communication line; and
    means for selecting one from the two-way communication line and the one-way communication line on the basis of the measured data transfer rates.

2. The network system according to claim 1, wherein one communication line from the two-way communication line and the one-way communication line is presently used for data transfer, wherein the other communication line from the two-way communication line and the one-way communication line is not presently used for data transfer, and wherein the means for measuring data transfer rates comprises:
    means for requesting the server to transfer required data over the other communication line not presently used for data transfer; and
    means for determining total time taken to transfer required data over the communication line presently used for data transfer and for determining total time taken to transfer the required data over the communication line not presently used for data transfer.

3. The network system according to claim 2, wherein the means for determining total time taken to transfer required data over the communication line presently used for data transfer and for determining the total time taken to transfer the required data over the communication line not presently used for data transfer comprises:
    means for measuring transfer latency expressing a time lag between a sending of a request to the server for data transfer and a time the required data begins to be received by the client;
    means for determining transfer time taken to transfer the required data based on the measured transfer rate and data volume of the required data; and
    means for determining total time taken to transfer the required data based on the determined transfer time and the transfer latency.

4. The network system according to claim 1, wherein one communication line from the two-way communication line and the one-way communication line is presently used for data transfer, wherein the other communication line from the two-way communication line and the one-way communication line is not presently used for data transfer, and wherein the means for selecting one from the two-way communication line and the one-way communication line comprises:
    means for comparing the two-way communication line with the one-way communication line in data transfer rate; and
    means for switching the communication line presently used for data transfer to the communication line not presently used for data transfer when the data transfer rate of the communication line not presently used for data transfer is faster than the data transfer rate of the communication line presently used.

5. The network system according to claim 1, wherein the one-way communication line includes a satellite communication line.

6. The network system according to claim 1, wherein the data transfer rates are periodically measured at a predetermined time interval.

7. A communication device for receiving data from a server over either one of a two-way communication line and a one-way communication line, the two-way communication line transmitting data between a server and a client bidirectionally and the one-way communication line transmitting data in only one direction from the server to the client, comprising:

means for measuring data transfer rates of the two-way communication line and of the one-way communication line; and
    means for selecting one from the two-way communication line and the one-way communication line on the basis of the measured data transfer rates.

8. The communication device according to claim 7, wherein one communication line from the two-way communication line and the one-way communication line is presently used for data transfer, wherein the other communication line from the two-way communication line and the one-way communication line is not presently used for data transfer, and wherein the means for measuring data transfer rates comprises:

means for requesting the server to transfer the required data over the other communication line not presently used for data transfer; and
    means for measuring total time taken to transfer required data over the communication line presently used for data transfer and for determining total time taken to transfer the required data over the communication line not presently used for data transfer.

9. The communication device according to claim 8, wherein the means for measuring total time taken to transfer required data over the communication line presently used for data transfer and for determining total time taken to transfer the required data over the communication line not presently used for data transfer comprises:

means for measuring transfer latency expressing a time lag between the sending of a request to the server for data transfer and the time the required data begins to be received by the client;
    means for determining transfer time taken to transfer the required data based on the measured transfer rate and data volume of the required data; and
    means for determining total time taken to transfer the required data based on the determined transfer time and the transfer latency.

10. The communication device according to claim 7, wherein one communication line from the two-way communication line and the one-way communication line is presently used for data transfer, wherein the other communication line from the two-way communication line and the one-way communication line is not presently used for data transfer, wherein the means for selecting one from the two-way communication line and the one-way communication line comprises:

means for comparing the two-way communication line with the one-way communication line in data transfer rate; and
    means for switching the communication line presently used for data transfer to the communication line not presently used when the data transfer rate of the communication line not presently used for data transfer is faster than the data transfer rate of the communication line presently used.

11. The communication device according to claim 7, wherein the one-way communication line comprises a satellite communication line.

12. The communication device according to claim 7, wherein the data transfer rate is periodically measured at a predetermined time interval.

13. A communication routing method for selecting a communication route for transferring data from a server to a client over either one of a two-way communication line for transmitting data between the server and the client bidirectionally and a one-way communication line for transmitting data in only one direction from the server to the client, comprising the steps of:

measuring data transfer rates of the two-way communication line and the one-way communication line; and
    selecting one from the two-way communication line and the one-way communication line on the basis of the measured data transfer rates.

14. The communication routing method according to claim 13, wherein one communication line from the two-way communication line and the one-way communication line is presently used for data transfer, wherein the other communication line from the two-way communication line and the one-way communication line is not presently used for data transfer, and wherein the step of measuring data transfer rates comprises:

requesting the server to transfer the required data over the other communication line not presently used for data transfer; and
    determining total time taken to transfer required data over the communication line presently used for data transfer and determining total time taken to transfer the required data over the communication line not presently used for data transfer.

15. The communication routing method according to claim 14, wherein the step of determining total time taken to transfer required data over the communication line presently used for data transfer and determining total time taken to transfer the required data over the other communication line, comprises performing the following steps for each of the communication line presently used for data transfer and communication line not presently used for data transfer:

measuring transfer latency expressing a time lag between a sending of a request to the server for data transfer and a time the required data begins to be received by the client;
    measuring the transfer rate of the required data;
    determining transfer time taken to transfer the required data based on the measured transfer rate and data volume of the required data; and
    determining total time taken to transfer the required data based on the determined transfer time and the transfer latency.

16. The communication routing method according to claim 13, wherein one communication line from the two-way communication line and the one-way communication line is presently used for data transfer, wherein the other communication line from the two-way communication line and the one-way communication line is not presently used for data transfer, and wherein the step of selecting one from the two-way communication line and the one-way communication line comprises:

comparing the two-way communication line with the one-way communication line in data transfer rate; and switching the communication line used for data transfer to the communication line not presently used when the data transfer rate of the communication line not presently used is faster than the data transfer rate of the communication line presently used.

17. The communication routing method according to claim 16, wherein the step of switching to the communication line not presently used comprises:

requesting the server to transfer data over the faster communication line not presently used, in parallel with the data transfer over the slower communication line presently used; and canceling data transfer over the slower communication line at the point that total data transfer volume over the faster communication line catches up with total data transfer volume over the slower communication line.

18. The communication routing method according to claim 13, wherein the data transfer rates are measured periodically at a predetermined time interval.

* * * * *